(12) United States Patent
Tsuyuki et al.

(10) Patent No.: US 6,661,609 B1
(45) Date of Patent: Dec. 9, 2003

(54) MAGNETIC TAPE CARTRIDGE

(75) Inventors: Seiji Tsuyuki, Kanagawa-ken (JP); Daisuke Takahashi, Kanagawa-ken (JP); Yusuke Ishihara, Kanagawa-ken (JP)

(73) Assignee: Fuji Photo Film Co., Ltd., Kanagawa-Ken (JP)

( * ) Notice: Subject to any disclaimer, the term of this patent is extended or adjusted under 35 U.S.C. 154(b) by 0 days.

(21) Appl. No.: 09/914,759

(22) PCT Filed: Feb. 10, 2000

(86) PCT No.: PCT/JP00/00739

§ 371 (c)(1), (2), (4) Date: Sep. 5, 2001

(87) PCT Pub. No.: WO00/54276

PCT Pub. Date: Sep. 14, 2000

(30) Foreign Application Priority Data

Mar. 5, 1999 (JP) .......................................... 11-058518

(51) Int. Cl.[7] ........................ G11B 23/107; G11B 23/28
(52) U.S. Cl. ....................................................... 360/132
(58) Field of Search ................................ 360/132, 133; 369/291

(56) References Cited

U.S. PATENT DOCUMENTS

| 5,335,875 | A |   | 8/1994  | Watanabe et al. |         |
|-----------|---|---|---------|-----------------|---------|
| 5,666,251 | A | * | 9/1997  | Fujii et al.    | 360/132 |
| 5,805,566 | A | * | 9/1998  | Kobayashi       | 369/291 |
| 6,370,108 | B1| * | 4/2002  | Ikebe et al.    | 369/291 |
| 6,466,405 | B1| * | 10/2002 | Rambosek        | 360/132 |

FOREIGN PATENT DOCUMENTS

| JP | 01263986  A | * | 10/1989 | ........... G11B/23/28 |
| JP | 4-93974     |   | 8/1992  |                        |
| JP | 05198138  A | * | 8/1993  | ........... G11B/23/28 |
| JP | 06162725  A | * | 6/1994  | ........... G11B/23/28 |
| JP | 07296557  A | * | 11/1995 | ........... G11B/23/28 |
| JP | 9-237482    |   | 9/1997  |                        |
| JP | 09237482  A | * | 9/1997  | ........... G11B/23/28 |
| JP | 9-270183    |   | 10/1997 |                        |
| JP | 09282837  A | * | 10/1997 | ........... G11B/23/28 |

* cited by examiner

*Primary Examiner*—William Klimowicz
(74) *Attorney, Agent, or Firm*—Sughrue Mion, PLLC

(57) ABSTRACT

Disclosed herein is a magnetic tape cartridge in which stable sliding operability and assembly performance of a write protection member for inhibiting magnetic recording onto magnetic tape are assured between a write-enable position and a write-inhibit position, including a single reel upon which a magnetic tape is wound, the reel being rotatably housed in a cartridge case constituted by an upper and lower case, and a write protection member. The sliding main body of the write protection member has a control portion, a protrusion, and a stopper piece. The stopper piece is provided on the inside surface of the sliding main body so that it protrudes in a direction perpendicular to the sliding direction of the main sliding body. The stopper piece is fitted in a stopper groove formed in an elastically deformable guide wall and holds a stopped position thereof.

4 Claims, 5 Drawing Sheets

F I G. 1
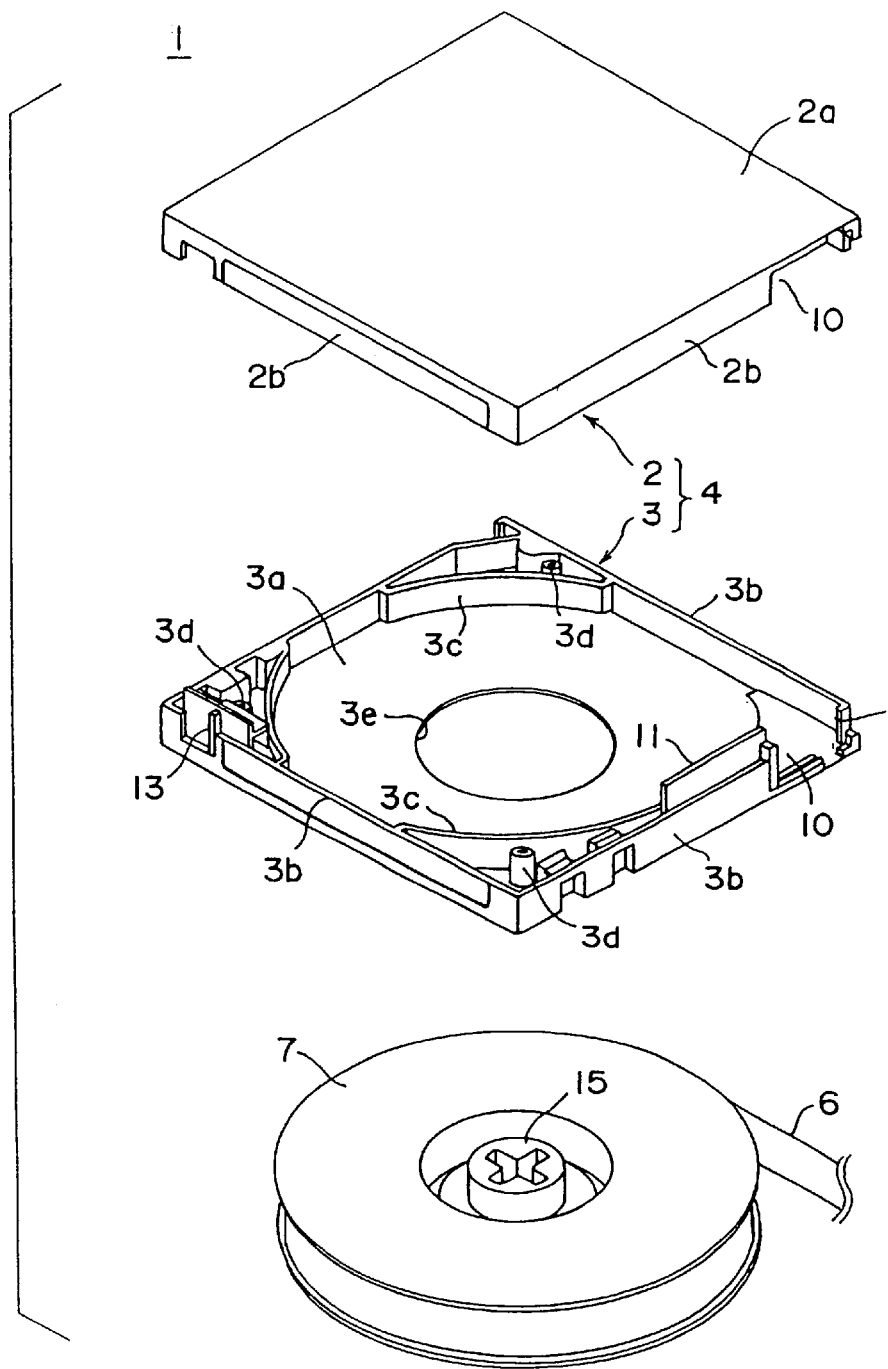

MAGNETIC TAPE CARTRIDGE

FIELD OF THE INVENTION

The present invention relates to a magnetic tape cartridge in which a single reel with magnetic tape wound thereon is rotatably housed within a cartridge case, and more particularly to the structure of a write protection member for inhibiting magnetic recording onto the magnetic tape.

BACKGROUND OF THE INVENTION

In existing magnetic tape cartridges, which are being used as storage media that are employed in external storage units for computers, etc., there is known a type where a single reel with magnetic tape wound thereon is rotatably housed within a cartridge case. This magnetic tape is employed to archive data for computers, etc. Since important information has been stored, a write protection member, movable between a write-enable position and a write-inhibit position, is installed so that problems, such as tape jamming, etc., do not occur and that magnetic recording is not performed on the magnetic tape inadvertently.

For example, as the aforementioned write protection member, a flat slide member is assembled to a side surface (rear surface) of the cartridge case. When the write protection member is moved to the write-inhibit position, the position of a recess in the write protection member is detected by contact of a sensor member provided in a drive unit, and data is inhibited from being written to the magnetic tape.

When it is installed in the cartridge case, the write protection member is provided on the rear surface (with respect to the insertion direction of the cartridge case into the drive unit) of the cartridge case, and the position of the write protection member (i.e., whether it has been positioned at the write-enable position or at the write-inhibit position) is detected at the rear surface of the cartridge case. In that case, however, it is necessary to move the sensor member when the cartridge case is loaded into or unloaded from the drive unit. Because of this, the sensor mechanism of the drive unit becomes structurally complicated and the aforementioned write protection structure is disadvantageous in assuring operational reliability.

From the points mentioned above, if a moved position of the write protection member can be detected through the bottom surface of the cartridge case, it is preferable in that the sensor mechanism of the drive unit can be simplified. However, it is desirable from the viewpoint of operability and display that a control portion for moving the write protection member be operated at a side surface (e.g., the rear surface) of the cartridge case.

However, in order to operate the write protection member at the side surface of the cartridge case and detect the position at the bottom surface, the following are required: the write protection member cannot be formed into a flat shape; it is necessary to assure the stable sliding function from the relationship with an installation space; it is necessary to reliably stop and lock the write protection member at the write-enable position and the write-inhibit position; the write protection member needs to be smoothly unlocked and moved; and it is necessary to assure satisfactory assembly performance of the write protection member with respect to the cartridge case.

Particularly, in the case where the write protection member is moved, the control portion of the write protection member is subjected to pushing-in force and therefore the locking force of the write protection member at the stopped position becomes so great that unlocking of the write protection member becomes difficult. Because of this, there is a possibility of operability being reduced.

In addition, the cartridge case is relatively large in height and accordingly the height of the write protection member is also increased. Because of this, some consideration is necessary to slide the write protection member in the lateral direction while preventing tilting of the write protection member.

The present invention has been made in view of the points mentioned above. Accordingly, it is the primary object of the present invention to provide a magnetic tape cartridge which is capable of assuring stable operation performance and assembly performance of the write protection member.

DISCLOSURE OF THE INVENTION

To achieve the object of the present invention mentioned above, there is provided a magnetic tape cartridge comprising a single reel with magnetic tape wound thereon; a cartridge case, which comprises an upper case and a lower case, for rotatably housing the single reel; and a write protection member for inhibiting magnetic recording onto the magnetic tape. The write protection member is slidably disposed within the cartridge case and comprises (1) a sliding main body; (2) a control portion provided on an outside surface of the sliding main body so that it is movable between a first position of enabling the magnetic recording and a second position of inhibiting the magnetic recording, while facing a control window formed in a side surface of the cartridge case; and (3) a protrusion, provided on a bottom portion of the sliding main body, which is inserted into a bottom hole formed in a sliding direction of the sliding main body in a bottom wall of the lower case and movable within the bottom hole. In the magnetic tape cartridge, a stopper piece is provided on an inside surface of the sliding main body so that it protrudes in a direction perpendicular to the sliding direction. Also, an elastically deformable guide wall is formed along the sliding direction in the cartridge case and has a first stopper groove and a second stopper groove at positions corresponding to the first and second positions. Furthermore, the stopper piece is fitted in the first or second stopper groove and holds a stopped position thereof.

In a preferred form of the present invention, the bottom hole of the cartridge case is formed adjacent to a side wall of the lower case. Also, a bottom wall, opposite to the side wall of the lower case and along the bottom hole, of the lower case has a sliding surface. Furthermore, the bottom portion of the sliding main body has a sliding surface which slidably contacts with the sliding surface of the lower case.

In another preferred form of the present invention, the cartridge case is provided with a regulation rib extending along the sliding direction of the sliding main body. Also, the inside surface of the sliding main body is brought into contact with the regulation rib when the control portion of the sliding main body is pushed inside the cartridge case.

In still another preferred form of the present invention, the stopper piece of the write protection member is slidable along an upper portion of the guide wall whose elastic deformation is great.

According to the present invention, the control portion of the write protection member is provided on the outside surface of the sliding main body so that it is movable between the first position of enabling the magnetic recording and the second position of inhibiting the magnetic recording, while facing the control window formed in a side surface of the cartridge case. This arrangement makes it possible to operate the write protection member at the side surface of the cartridge case. Also, a protrusion is provided on the bottom portion of the sliding main body of the write protection member and is inserted into the bottom hole formed in the bottom wall of the lower case and is movable within the bottom hole. This arrangement renders it possible to detect the position of the write protection member at the bottom surface of the lower case. On the other hand, the stopper piece of the write protection member is provided on the inside surface of the sliding main body so that it protrudes in a direction perpendicular to the sliding direction. Also, an elastically deformable guide wall is formed along the sliding direction in the cartridge case and has a first stopper groove and a second stopper groove at positions corresponding to the first and second positions. The stopper piece is fitted in the first or second stopper groove and holds a stopped position thereof. With this arrangement, the stopped position of the write protection member being at the first or second position can be locked and held. Also, even if the control portion of the write protection member is pushed inside the cartridge case, when the control portion is operated to move the write protection member from the first position to the second position, or from the second position to the first position, the guide wall is elastically deformed. Therefore, stable disengagement between the stopper piece and the stopper groove can be performed without requiring great force. Thus, satisfactory operability is obtained, whereby reliability can be assured.

In the case where the bottom hole of the cartridge case is formed adjacent to the side wall of the lower case, the write protection member becomes unstable, because an area in the bottom portion for supporting the write protection member is reduced. However, if the bottom wall, opposite to the side wall of the lower case and along the bottom hole, of the lower case has a sliding surface, and the bottom portion of the sliding main body has a sliding surface which slidably contacts with the sliding surface of the lower case, an area in the bottom portion for supporting the write protection member is increased and therefore the sliding of the write protection member can be stabilized.

In addition, if the cartridge case is provided with a regulation rib extending along the sliding direction of the sliding main body, the inside surface of the sliding main body is brought into contact with the regulation rib, when the control portion of the sliding main body is pushed inside the cartridge case to slide the write protection member. In this manner, the movement of the write protection member is regulated by the regulation rib and the pushing force of the stopper piece against the stopper groove is prevented from being excessive. Thus, stable disengagement of the stopper piece from the stopper groove is obtained.

Furthermore, if the stopper piece of the write protection member is provided so that it is slidable along an upper portion of the guide wall whose elastic deformation is great, more stable operation of the write protection member can be assured by effectively utilizing the elastic deformation of the guide wall.

BRIEF DESCRIPTION OF THE DRAWINGS

The present invention will be described in further detail with reference to the accompanying drawings wherein:

FIG. 1 is an exploded perspective view of a magnetic tape cartridge according to an embodiment of the present invention;

BEST MODE FOR CARRYING OUT THE INVENTION

Figure 2:
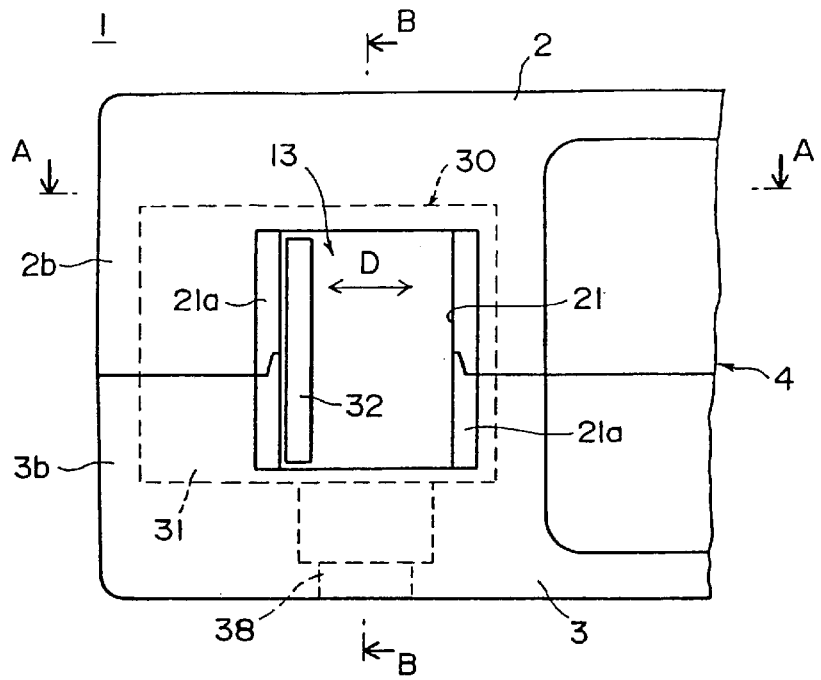
FIG. 2 is a front view of the magnetic tape cartridge near the write protection member of FIG. 1.
Figure 3:
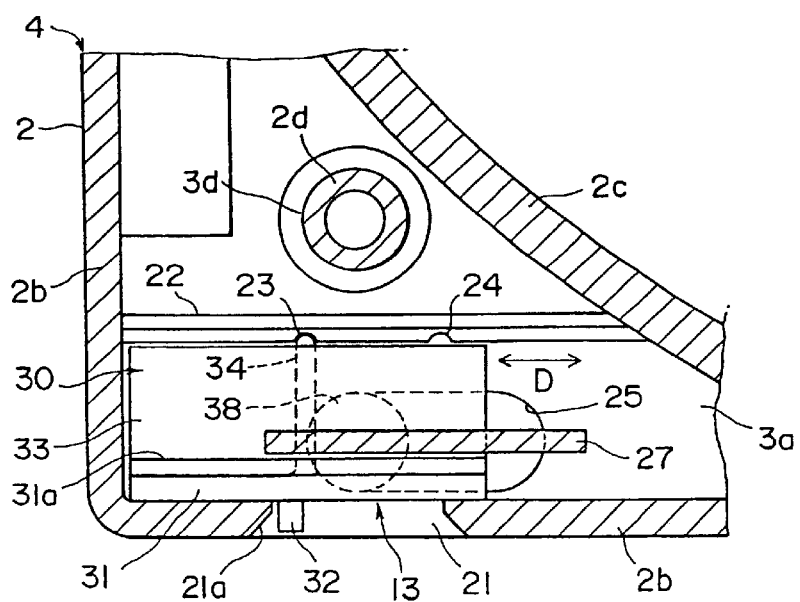
FIG. 3 is a sectional plan view taken substantially along line A—A of FIG. 2.

Referring now to the drawings, a description of the preferred embodiments of the present invention will be given in greater detail. In FIG. 1, there is shown a magnetic tape cartridge 1 in accordance with a preferred embodiment of the present invention. The magnetic tape cartridge 1 has a cartridge case 4, which is formed by fastening an upper case 2 and a lower case 3 together with small screws, etc. Within the cartridge case 4, a single reel 7 with magnetic tape 6 wound thereon is rotatably housed. The upper and lower cases 2 and 3 have side walls in which an opening 10 is formed to pull the magnetic tape 6 out of the cartridge case 4. Near this opening 10, there is provided a slide door 11 that is opened and shut. The slide door 11 is urged in a closing direction by an elastic means (not shown).

During non-use of the magnetic tape cartridge 1, the magnetic tape 6 is completely wound on the reel 7. A write protection member 13 for inhibiting magnetic recording, described in detail later, is slidably disposed in the rear end of the cartridge case 4.

In FIG. 1, the upper and lower cases 2, 3 are formed into a generally rectangular shape and provided with side walls 2b, 3balong the peripheries of the top wall 2aand the bottom wall 3a. The upper and lower cases 2, 3 are further provided with arc-shaped inner walls 3c(arc-shaped inner walls for the upper case 2 are not shown) along the outer periphery of the reel 7. The lower case 3 has four boss portions 3d(the boss portion 3dnear the opening 10 is hidden behind the slide door 11) between the sidewalls 3band the inner walls 3c. Similarly, the lower case 2 has four boss portions (not shown). The lower case 3 is fastened to the upper case 2 by abutting the boss portions 3dof the lower case 3 with the boss portions of the upper case 2 and then tightening small screws through the bottom surface of the lower case 3 (see FIG. 4).

The center portion of the lower case 3 also has a center hole 3eso that the reel 7 can be driven by a driving shaft of a drive unit. The center portion of the reel 7 is provided with a rotation regulating mechanism 15 for restricting rotation of the reel 7 during non-use of the magnetic tape cartridge 1.

Further, although not shown, the reel 7 includes a reel plate mounted on the central portion of the bottom surface thereof. The reel plate is used for attracting and holding a magnet type rotation means. The radially outer portion of the bottom surface of the reel 7 has a reel gear that meshes with the driving gear of the rotation means. If the reel gear and the driving gear mesh with each other, the rotation regulating mechanism 15 performs an unlocking operation, whereby the reel 7 can freely rotate.

The write protection member 13 and the structure for installing said member 13 will hereinafter be described in detail with reference to FIGS. 2 to 9.

In the left end portion of the rear surface (with respect to an insertion direction in which the cartridge case 4 is inserted) of the cartridge case 4, a generally rectangular window 21 is formed in the side walls 2b, 3bof the upper case 2 and the lower case 3. Inside this control window 21, the write protection member 13 is disposed so that it is slidable in a sliding direction D (right and left direction) along the side walls 2b, 3bof the upper and lower cases 2, 3.

The write protection member 13 is equipped with a sliding main body 30, which has a certain degree of longitudinal length in the sliding direction D, a depth, and a height. The sliding main body 30 has a flat main wall 31 extending in the sliding direction D along the side walls 2b, 3bof the upper and lower cases 2, 3. The main wall 31 is provided with a vertical rib-shaped control portion 32 at approximately the central portion of the outside surface thereof. The control portion 32 is movable within the control window 21 in the right and left directions between a first position (state of FIGS. 2 to 5) of enabling magnetic recording and a second position (state of FIG. 6) of inhibiting magnetic recording, while facing the control window 21. That is, the control portion 32 is moved in the right or left direction with a finger. Near the left and right edges of the control window 21, inclined surfaces 21aare formed so that the control portion 32 being positioned at the left or right edge of the control window 21 can be easily held with a finger.

The sliding main body 30 also has a horizontal wall 33 and a stopper piece 34. The horizontal wall 33 is provided on the upper portion of the inside surface of the main wall 31, and the stopper piece 34 is provided below the horizontal wall 33 and extends rearward from the inside surface of the main wall 31 in a direction approximately perpendicular to the sliding direction D.

Figure 6:
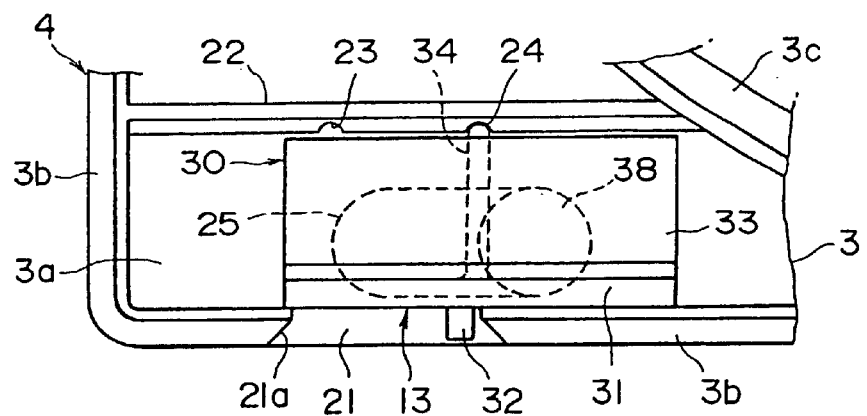
FIG. 6 is a fragmentary plan view showing the state in which the write protection member has been moved, the upper case having been removed to show the write protection member.
Figure 7:
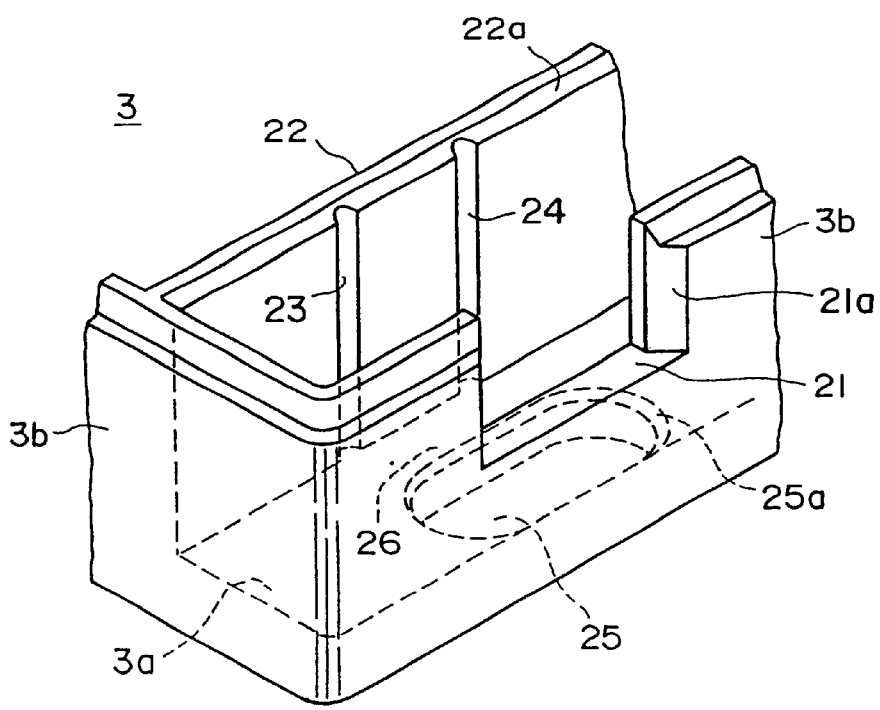
FIG. 7 is a fragmentary perspective view of the lower case.
Figure 8:
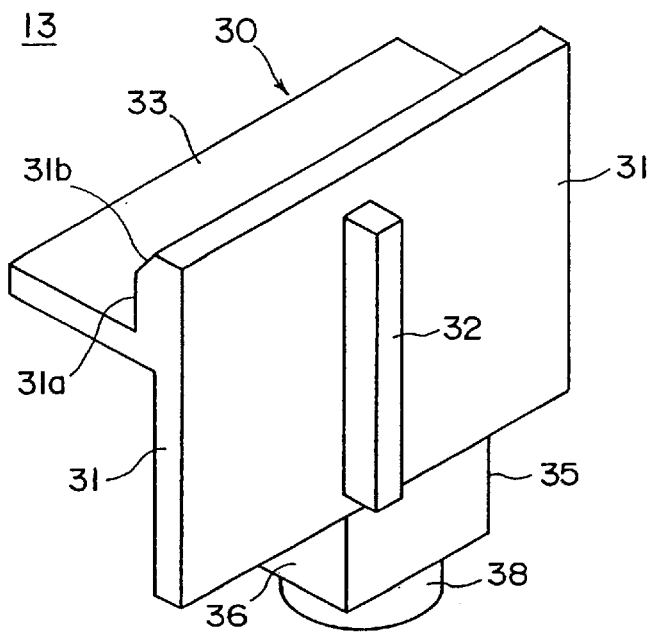
FIG. 8 is a perspective view showing the top structure of the write protection member.

On the other hand, the lower case 3 of the cartridge case 4 is provided with a guide wall 22 extending in the sliding direction in parallel with the side wall 3bin which the control window 21 is formed. The upper portion of the guide wall 22 is elastically deformable so that its upper portion can be bent. The side surface of the guide wall 22 has a first vertical stopper groove 23 and a second vertical stopper groove 24 at positions corresponding to the first position and the second position of the write protection member 13. The first stopper groove 23 and the second stopper groove 24 are formed parallel to each other. The guide wall 22 has nearly the same height as the side wall 3band is formed so that it connects the side wall 3b, which is perpendicular to the side wall 3bhaving the control window 21, with a curved inner wall 3c(FIG. 6).

When the write protection member 13 is at the first position or the second position, the outer end of the stopper piece 34 is held in the first stopper groove 23 or the second stopper groove 24 of the guide wall 22. In this manner, the write protection member 13 is held and locked at the first position or the second position. The stopper piece 34 is provided on the inside surface of the main wall 31 so that it can slide along the upper portion of the guide wall 22 whose elastic deformation is great. The guide wall 22 has inclined surface 22aat the top edge thereof (see FIG. 7).

Figure 9:
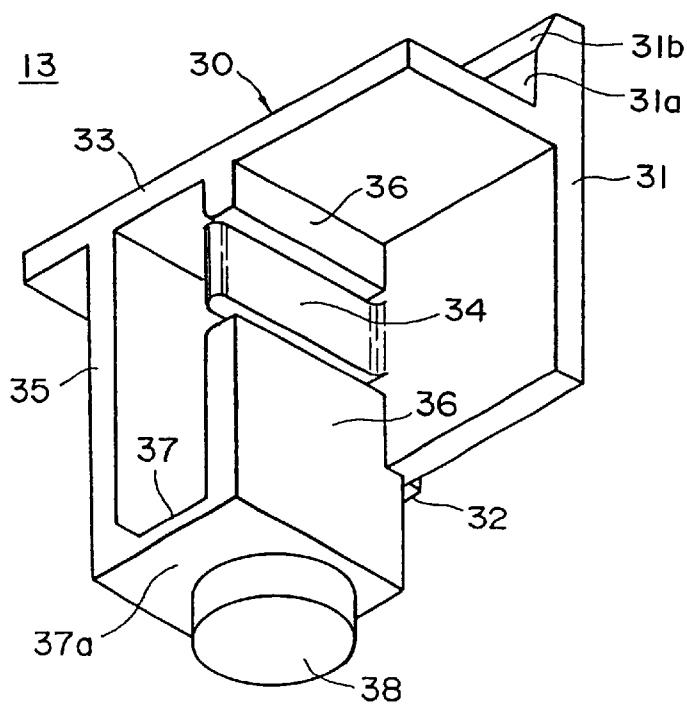
FIG. 9 is a perspective view showing the bottom structure of the write protection member.

A first vertical wall 35 and a second vertical wall 36, vertically erected in the rear surface of the main wall 31, are provided on the bottom surface of the horizontal wall 33 of the sliding main body 30 so that they are parallel to each other (see FIG. 9). The rear end surfaces of the first and second vertical walls 35, 36 are provided in proximity to the side wall of the guide wall 22. The second vertical wall 36 is divided into three parts, and the central part of the three is formed as the stopper piece 34. The stopper piece 34 is made thin and formed so that the outer end thereof projects beyond the rear end surfaces of the horizontal wall 33, the first vertical wall 35, and the second vertical wall 36. The outer end of the stopper piece which is fitted in the stopper groove 23 or 24 is formed into a curved surface (R-surface).

The bottom surfaces of the first vertical wall 35 and second vertical wall 36 which extend downward beyond the main wall 31 are connected by a horizontal bottom wall 37. The bottom surface of the bottom wall 37 is provided with a cylindrical protrusion 38 extending downward therefrom.

On the other hand, the bottom wall 3aof the lower case 3 is provided with an elongated bottom hole 25 extending in the sliding direction D of the write protection member 13. The protrusion 38 of the sliding main body 30 of the write protection member 30 is inserted into the bottom hole 25 and movable within the bottom hole 25. Note that the bottom hole 25 has an inclined surface 25a (see FIG. 7) at the upper edge so that the protrusion 38 can be easily inserted.

The bottom hole 25 is formed adjacent to the side wall 3bof the lower case 3, and the bottom wall 3a, opposite to the side wall 3bof the lower case 3 and along the bottom hole 25, has a sliding surface 26. The sliding surface 26 of the bottom wall 3aof the lower case 3 is contacted by a sliding surface 37a, provided on the bottom surface of the bottom wall 37 of the sliding main body 30 of the write protection member 13.

The upper portion of the main wall 31 of the sliding main body 30 of the write protection member 13, extending upward beyond the horizontal wall 33, is formed thicker than the lower portion of the main wall 31. The inside surface 31aof the upper portion of the main body 31 extends in the sliding direction D of the write protection member 31 and has an inclined surface 31bat the upper edge thereof.

Figure 4:
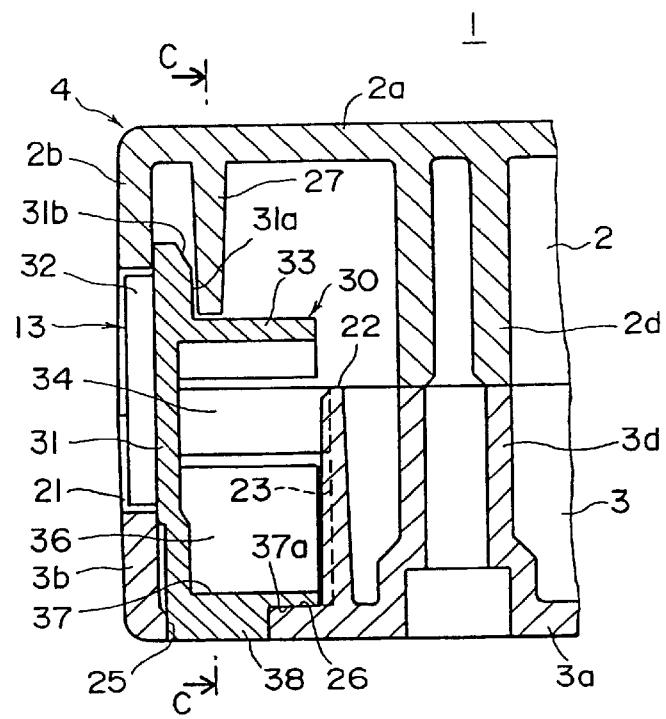
FIG. 4 is a sectional side view taken substantially along line B—B of FIG. 2.
Figure 5:
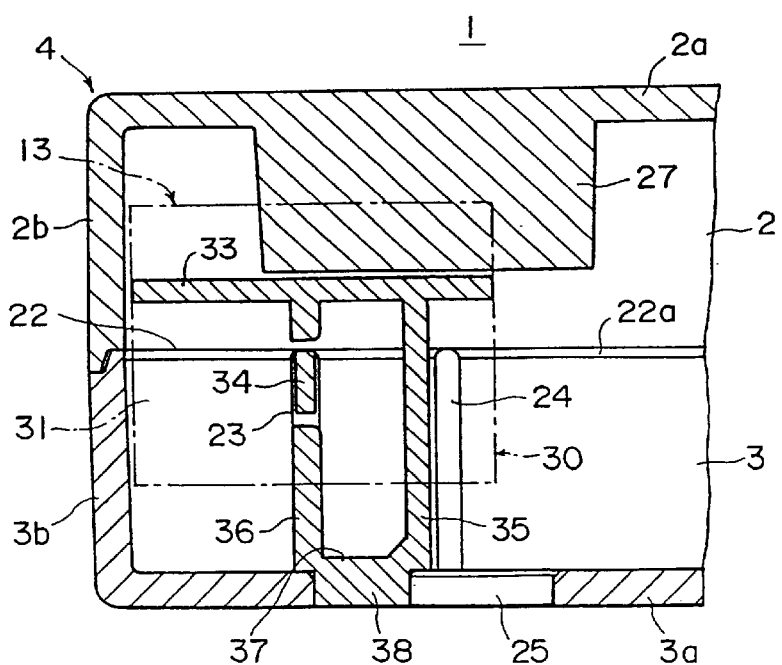
FIG. 5 is a sectional front view taken substantially along line C—C of FIG. 2.

On the other hand, the top wall 2aof the upper case 2 is provided with a regulation rib 27 extending downward and along the sliding direction D of the sliding main body 30. When the control portion 32 is pushed toward the inside of the cartridge case 4, the inside surface 31aof the sliding main body is brought into contact with the regulation rib 27. Also, when the sliding main body 30 is moved upward, the top surface of the horizontal wall 30 is brought into contact with the bottom surface of the regulation rib 27. In this way, the rearward movement and the upward movement of the sliding main body 30 are regulated by the regulation rib 27. Note that the front and rear flat portions of the regulation rib 27 are inclined as shown in FIG. 4 and that the right and left edges are also inclined as shown in FIG. 5.

When the write protection member as described above 13 is assembled into the cartridge case 4, the lower case 3 is first placed with the top upward. Then, the bottom protrusion 38 of the write protection member 13 is inserted into the bottom hole 25 of the bottom wall 3aof the lower case 3, while the stopper piece 34 is brought into engagement with the first stopper groove 23 (or the second stopper groove 24). At the same time, the control portion 32 of the sliding main body 32 is inserted into the control window 21. At this point, the inclined surfaces 22a, 25afacilitate the insertion of the write protection member 13. Next, the upper case 2 is stacked on the lower case 3, and they are fastened together. When they are assembled together, the upper case 3 is also guided by the inclined surface 31*b* and therefore reliable assembling is performed.

According this embodiment, when the write protection member 13 is at the first position of enabling magnetic recording (FIGS. 2 to 5), the stopper piece 34 is fitted in the first stopper groove 23, whereby the write protection member 13 is held and locked at the first position. In this state, the bottom protrusion 38 is positioned at one end of the bottom hole 25, and the control portion 32 is positioned at one end of the control window 21. These positions indicate that the write protection member 13 has been held in the first position of enabling magnetic recording. The positions of the bottom protrusion 38 and the control portion 32 are detected by a sensor provided in the drive unit, and a magnetic head is allowed to write data to the magnetic tape 6.

On the other hand, in the case where magnetic recording is inhibited to protect data recorded on the magnetic tape 6, the write protection member 13 is moved to the second position of inhibiting magnetic recording. That is, the write protection member 13 is slid to the second position by moving the control portion 32 with a finger. Since the outer end of the stopper piece 34 has been fitted in the first stopper groove 23, the stopper piece 34 is pushed inward against the guide wall 22. As a result, the guide wall 22 is elastically deformed and the stopper piece 34 is disengaged from the first stopper groove 23. The stopper piece 34 is slid toward the second stopper groove 24 along the wall surface of the guide wall 22. When the stopper piece 34 reaches the second stopper groove 24, the outer end of the stopper piece 34 is fitted in the second stopper groove 24. The deformed guide wall 22 returns to its original state, whereby the write protection member 13 is stopped and held at the second position. In this state, the bottom protrusion 38 is positioned at the other end of the bottom hole 25, and the control portion 32 is positioned at the other end of the control window 21. These positions indicate that the write protection member 13 is at the second position of inhibiting magnetic recording. The positions of the bottom protrusion 38 and the control portion 32 are detected by the sensor of the drive unit, and the magnetic head is inhibited from writing data to the magnetic tape 6. When it is returned from the second position to the first position, the write protection member 13 is operated in the direction opposite to the aforementioned case.

The sliding operation of the write protection member 13 is performed only by moving the control portion 32 in the right and left directions. However, there are cases where the control portion 32 is pushed toward the inside of the cartridge case, depending on the operator. In those cases, the write protection member 13 is moved inward. However, excessive inward movement of the write protection member 13 is prevented, because the inside surface 31*a* of the sliding main body 30 is brought into contact with the regulation rib 27 of the upper case 2. When the control portion 32 is pushed toward the inside of the cartridge case, the stopper piece 34 is also pushed against the guide wall 22. However, the guide wall 22 is elastically deformed, whereby the pushing force transmitted from the stopper piece 34 to the stopper groove 23 or 24 is alleviated. Therefore, the disengagement of the stopper piece 34 from the stopper groove 23 or 24 is easily performed and the write protection member 13 is slid without difficulty. Thus, operability is enhanced.

While the present invention has been described with reference to the preferred embodiment thereof, the invention is not to be limited to the details given herein, but may be modified within the scope of the invention hereinafter claimed.

We claim:

1. A magnetic tape cartridge comprising:
    a single reel with magnetic tape wound thereon;
    a cartridge case, which comprises an upper case and a lower case, for rotatably housing said single reel; and
    a write protection member for inhibiting magnetic recording onto said magnetic tape, slidably disposed within said cartridge case, further comprising
        a sliding main body,
        a control portion provided on an outside surface of said sliding main body so that it is movable between a first position of enabling said magnetic recording and a second position of inhibiting said magnetic recording, while facing a control window formed in a side surface of said cartridge case, and
        a protrusion, provided on a bottom portion of said sliding main body, which is inserted into a bottom hole formed in a sliding direction of said sliding main body in a bottom wall of said lower case and movable within said bottom hole;
        wherein a stopper piece is provided on an inside surface of said sliding main body so that it protrudes in a direction perpendicular to said sliding direction;
        wherein an elastically deformable guide wall is formed along said sliding direction in said cartridge case and has a first stopper groove and a second stopper groove at positions corresponding to said first and second positions;
        and wherein said stopper piece is fitted in said first or second stopper groove and holds a stopped position thereof.

2. The magnetic tape cartridge as set forth in claim 1, wherein
    the bottom hole of said cartridge case is formed adjacent to a side wall of said lower case;
    a bottom wall, opposite to the side wall of said lower case and along said bottom hole, of said lower case has a sliding surface;
    the bottom portion of said sliding main body has a sliding surface which slidably contacts with said sliding surface of said lower case.

3. The magnetic tape cartridge as set forth in claim 1, wherein
    said cartridge case is provided with a regulation rib extending along the sliding direction of said sliding main body, and the inside surface of said sliding main body is brought into contact with said regulation rib when the control portion of said sliding main body is pushed inside said cartridge case.

4. The magnetic tape cartridge as set forth in claim 1, wherein the stopper piece of said write protection member is slidable along an upper portion of said guide wall whose elastic deformability is great.

* * * * *